United States Patent
Takeyama

(10) Patent No.: US 8,190,038 B2
(45) Date of Patent: May 29, 2012

(54) IMAGE FORMATION APPARATUS CAPABLE OF REDUCING THE NUMBER OF OUTPUT SIGNAL LINES

(75) Inventor: Yoshinobu Takeyama, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1193 days.

(21) Appl. No.: 12/003,306

(22) Filed: Dec. 21, 2007

(65) Prior Publication Data

US 2008/0212127 A1    Sep. 4, 2008

(30) Foreign Application Priority Data

Dec. 25, 2006  (JP) ................................. 2006-348609

(51) Int. Cl.
G03G 15/00 (2006.01)
G03G 21/00 (2006.01)
H04N 1/00 (2006.01)

(52) U.S. Cl. ............................. 399/12; 358/1.15; 399/9
(58) Field of Classification Search ................ 399/9, 12, 399/38, 75, 78; 358/1.15
See application file for complete search history.

(56) References Cited

U.S. PATENT DOCUMENTS

2002/0016893 A1* 2/2002 Asauchi ................... 711/154
2008/0019710 A1* 1/2008 Takeyama ................. 399/12

FOREIGN PATENT DOCUMENTS

JP  2002-258691  9/2002
JP  2006-218682  8/2006

* cited by examiner

*Primary Examiner* — Sophia S Chen
(74) *Attorney, Agent, or Firm* — Harness, Dickey & Pierce

(57) ABSTRACT

In the image formation apparatus according to the present invention, a plurality of detection sections outputs binary signals to a detection identification control section, and an image formation control section for control of periphery of the engine of the apparatus outputs a detection section identifying signal and a detection section period signal to the detection identification control section. Also, the detection identification control section outputs a detection result of the detection sections as detection data to a control board. A plurality of driver sections are connected to a driver identification control section via a data line through which driving signals for driving a section to be driven are transmitted. Accordingly, the present invention provides a versatile image formation apparatus with a reduced number of output lines which can deal with a change of image formation system without increasing the number of signal lines.

11 Claims, 10 Drawing Sheets

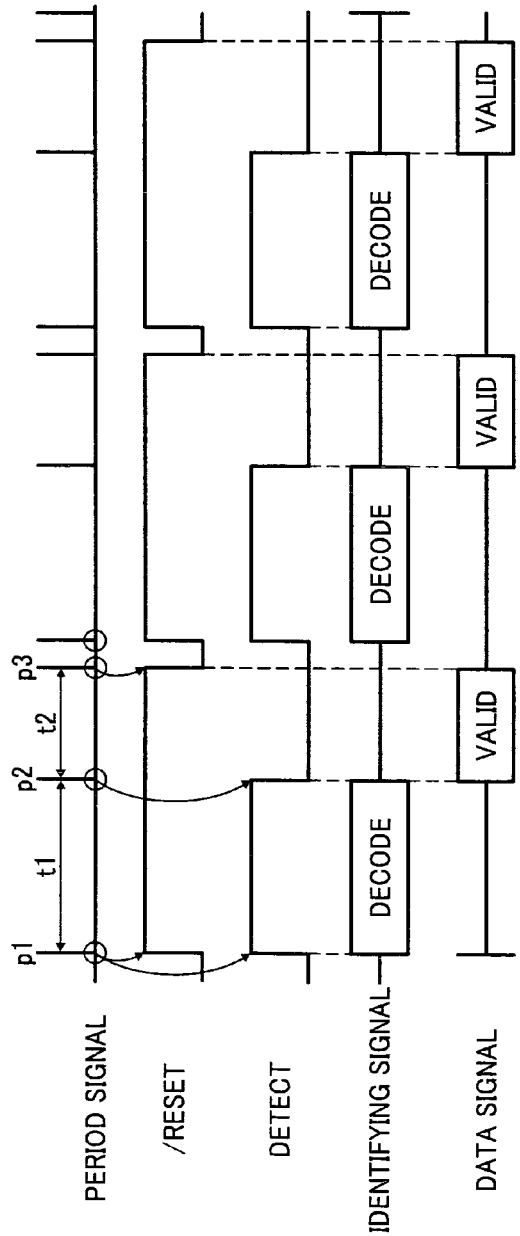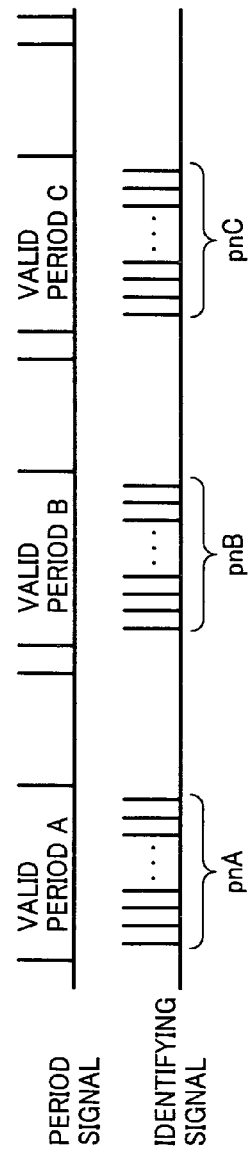

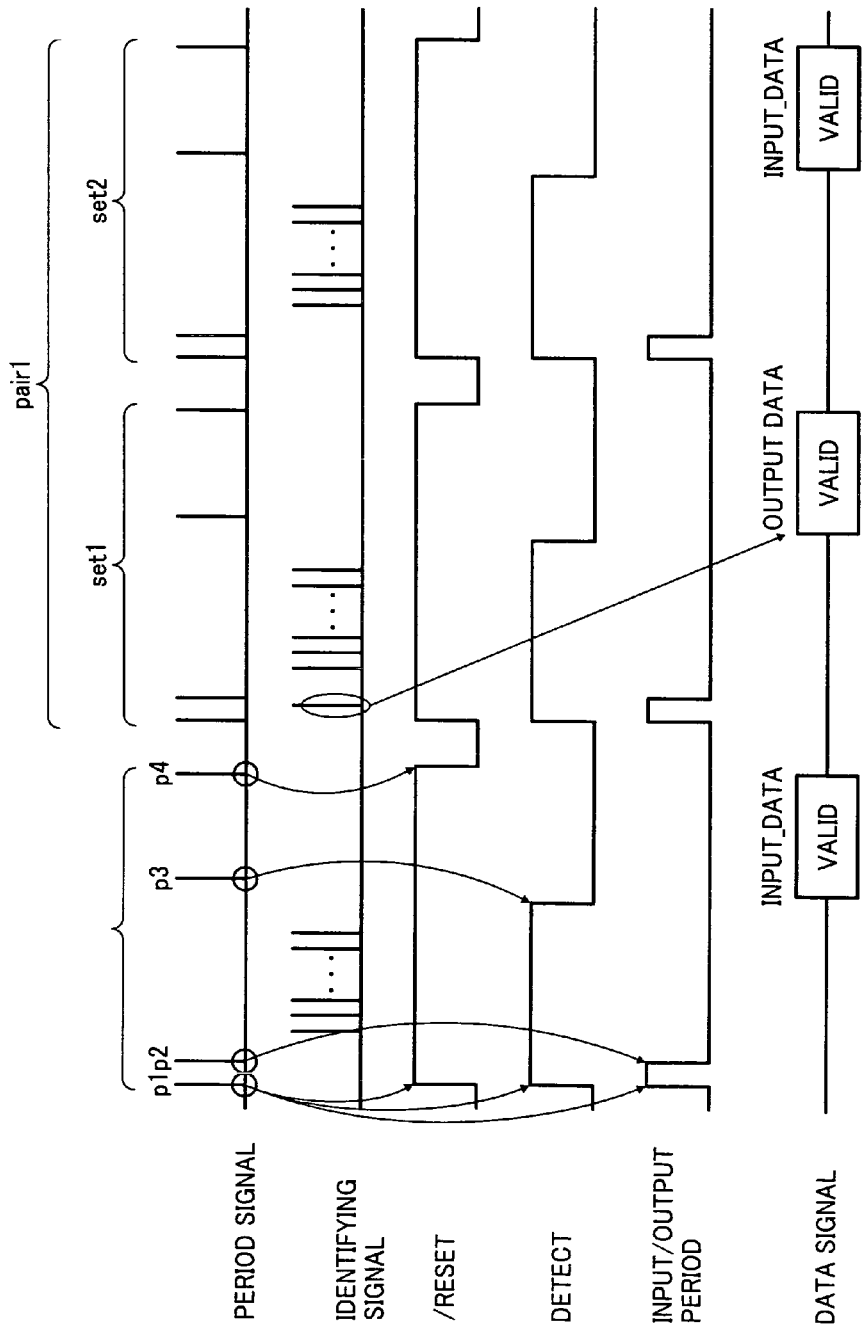

IMAGE FORMATION APPARATUS CAPABLE OF REDUCING THE NUMBER OF OUTPUT SIGNAL LINES

CROSS REFERENCE TO RELATED APPLICATION

The present application is based on and claims priority from Japanese Patent Application No. 2006-348609, filed on Dec. 25, 2006, the disclosure of which is hereby incorporated by reference herein in its entirety.

BACKGROUND OF THE INVENTION

1. Field of the Invention

The present invention relates to an image formation apparatus, particularly to an image formation apparatus with a number of signal lines reduced by transmitting (multiplexing a plurality of signals on one signal line.

2. Description of the Related Art

FIG. 13 shows a basic system configuration of peripheral devices of the engine of a conventional image formation apparatus as a way of example. An image formation section (image formation control board inside the apparatus body) 51 is connected with a plurality of detachable (replaceable) units 52 to 58 and a large number of input/output signals. The detachable units are a developer unit 68, a fixation unit 52 or the like and provided with respective detection sections. Signals indicating that the units are detached from or attached to the apparatus body are inputted to the formation section from the detection sections. Also, detection signals are inputted thereto from the detection sections such as a sensor 59 or detecting temperature/humidity outside and inside the apparatus, a sensor 60 for detecting position/status information on a contact/release mechanism driven upon image formation and a storage medium, or a toner concentration sensor 54. A paper size sensor 55 and a sensor for a paper feeder unit 53 both have a signal line of plural bits, causing substantial increase in the number of signal lines. Also, feedback signals (not-shown) from high-voltage power supply or the like are inputted to the image formation section.

Moreover, each unit includes plural actuators such as a motor, a solenoid, or a clutch, and drivers for the actuators. An image formation control board (hereinafter, to be referred to as control board) outputs driving signals to the drivers as output signals. Along with full colorization, sophistication and multi-function of the image formation apparatus, the number of signal lines for the input signals to the detection sections and the output signals for the drivers has been increasing. The detection sections and actuators need power supply to operate in addition to detection signals or driving signals (data signals). As a result, a large number of signal lines and power supply lines are necessary to input the detection signals from the detection sections to the control board 51 and output the driving signals to the drivers from the control board which increases the size of the control board 51. Since the control board 51 is disposed in a distant position from the respective units and the detection sections, the large number of signals lines are wired for connecting them inside the apparatus, leading to preventing simplification, downsizing, and cost reduction of the apparatus.

Japanese Laid-Open Patent Application Publication No. 2002-258691 (Document 1) has disclosed an image formation apparatus which is provided with detachable expendables units each including an I/O expander connected via a serial bus. The image formation apparatus body includes a control section which identifies a kind of the expendables units according to a state of an input port of the I/O expander. Japanese Laid-Open Patent Application Publication No. 2006-218682 (Document 2 has disclosed a head data transfer apparatus which transfers serial image data and control signals via a same data signal line. The head data transfer apparatus includes a print bead data transfer device transferring a transfer clock and serial transfer data via an FPC cable to driver ICs corresponding to the respective print heads mounted on a recording head, and the driver ICs provided with a serial data latch signal generator circuit for internally generating serial data latch signals by use of a serial transfer clock as a reset signal and of serial transfer data as a serial data latch signal inverse trigger.

For firming images with the conventional image formation apparatus, it is necessary to conduct detailed control over the actuators in accordance with the state and operation of the respective units of the apparatus. In order to do so, the image formation apparatus needs to have an enormous number of signal lines for input/output to/from the image formation control board 51, which causing a problem of complicating the system of the apparatus and preventing the downsizing thereof. Further, another problem is in that in changing the system configuration of the apparatus number of input/output sons), it entails a lot of cost for preparing a new image formation control section in accordance with the changed configuration.

Moreover, the technique disclosed in the Document 1 has a problem of high production cost per unit since the IO expander in each expendables unit identifies a kind of the unit connected thereto only; therefore, it has to be provided in every expendables unit. Similarly, the technique disclosed in the Document 2 has a problem that a difficult, complex control has to be made for separation of serial image data and a control signal since both are transferred as a common data signal.

SUMMARY OF THE INVENTION

In view of solving the above problems, an object of the present invention is to provide an image formation apparatus with a less number of input signal lines and a less number of output signal lines which am reduced by transmitting signals from a plurality of status detection sections (sensors) via a same signal line and by transmitting drive control signals to a plurality of driver sections via a same signal line, respectively. Thereby, the present invention can provide an image formation apparatus with versatility which is able to deal with a change in image formation system configuration due to a decease or increase in the number of actuators and detection sections, without an increase in the number of the signal lines.

According to a first aspect of the present invention, an image formation apparatus including a plurality of detection sections performing status detection of the apparatus and a plurality of driver sections driving the apparatus, includes: a first set of signal lines including a detection data line through which a detection result from the plurality of detection sections is transmitted, a first identifying signal line through which a first identifying signal to identify one of the plurality of detection sections is transmitted, and a first valid period signal line through which a first period signal to determine a valid period of the first identifying signal on the detection section identifying signal line and to determine a valid period of data on the detection data line is transmitted; a detection identification control section which identifies a detection section in question according to the first identifying signal, and determines data on the detection data line as valid data for the detection section in question; a second set of signal lines including a drive control data line through which a drive control signal is transmitted to the plurality of driver sections, a second identifying signal line through which a second identifying signal to have identified one driver section from the plurality of driver section is transmitted, and a second valid period signal line through which a second period signal to determine a valid period of the second identifying signal on the driver section identifying signal line and to determine a valid period of data on the drive control data line is transmitted, a driver identification control section which identifies a driver section in question according to the second identifying signal and determines data on the driver control data line as valid data for the driver section in question and an image formation control section which controls the detection identification control section and the driver identification control section.

According to the first at of the present invention, after validating the first and second identifying signals to be outputted to the first and second identifying signal lines according to the first and second period sib outputted from the image formation control section to the first and second valid period signal lines, the detection identification control section and the driver identification control section determine data on the detection data line and on the drive control data line as valid data for the detection section or the driver section determined by the respective identifying signals.

According to a second aspect of the present invention, an image formation apparatus including a plurality of detection sections performing status detection of the apparatus and a plurality of driver sections driving the apparatus, includes an input/output data control device including an identification control section which additionally sets, before determining a data valid period of a data line, an input/output period on a period signal line through which a period signal to determine the data valid period of the data line is transmitted, outputs an identifying signal of the detection sections and an identifying signal of the driver sections via a common identifying signal line and outputs data of a plurality of detection sections and data of a plurality of driver sections via a common data line to determine data input/output on the data line according to a state of the identifying signal line during the input/output period determined by the period signal, identifies a detection section or a driver section in question according to the identifying signal line, the data line, and the period signal line, and determines the data on the data line as valid data for the identified section, the input/output period being a period for which data input/output on the data line is decided.

According to a third aspect of the present invention, an image formation apparatus including a plurality of detection sections performing status detection of the apparatus and a plurality of driver sections driving the apparatus, includes an input/output data control device including an identification control section which additionally sets, immediately prior to a period where an identifying signal is validated, an input/output period on a period signal line through which a period signal to determine a data valid period of a data line is transmitted, outputs an identifying signal of the detection sections and an identifying signal of the driver sections via a common identifying signal line and outputs data of a plurality of detection sections and data of a plurality of driver sections via a common data line to determine data input/output on the data line according to a state of the identifying signal line during the input/output period determined by the period signal, identifies a detection section or a driver section in question according to the identifying signal line, the data line, and the period signal line, and determines the data on the data line as valid data for the identified section, the input/output period being a period for which data input/output on the data line is decided.

According to the first to third aspects of the present invention, a pulse is output to the identifying signal line according to a section to be identified during a period where data on the data line determined by the period signal is validated. Also, when the section to be identified is a detection section, erroneous setting of the identifying signal can be decided, and when the section to be identified is a driver section, driving timing therefor is finely adjustable.

According to the second and third aspects of the present invention, the image formation apparatus further includes a plurality of input/output data control devices including a set of signal lines composed of the data line, the identifying signal line, and the period signal line, and the identification control section, in which each of the input/output data control devices is provided for each location, function, or unit where the detection sections and the driver sections are disposed.

According to the second and third aspects of the invention, the image formation apparatus further includes a plurality of identification control sections identifying a detection section or a driver section in question according to an identifying signal line to determine data on a data line as valid data for the identified section, in which each of the identification control sections is provided for each location, function or unit where the detection sections and the driver sections are disposed, and the plurality of identification control sections are connected with a set of signal lines composed of the data line, the identifying signal line, and the period signal line.

Accordingly, according to the present invention, with the simple configuration described above, it is made possible to reduce the number of sensor signals (input signal lines) required for the image formation apparatus and the number of driving signals (output signal lines) for the actuators and so on.

BRIEF DESCRIPTION OF THE DRAWINGS

FIG. 2 is a timing chart showing periods where a detection identifying signal and a detection data signal are validated by detection section period signals;

FIG. 3 shows an example of the identification of the detection section;

FIG. 9 shows period signals according to the present invention;

DETAILED DESCRIPTION OF THE PREFERRED EMBODIMENT

Hereinafter, embodiments of the present invention will be described in detail with reference to the accompanying drawings. It should be understood that elements, kinds, combinations, forms, or relative arrangements of the elements described in the embodiments are exemplified only for the purpose of describing the present invention unless otherwise stated; therefore, the present invention should not be limited thereto.

Figure 1:
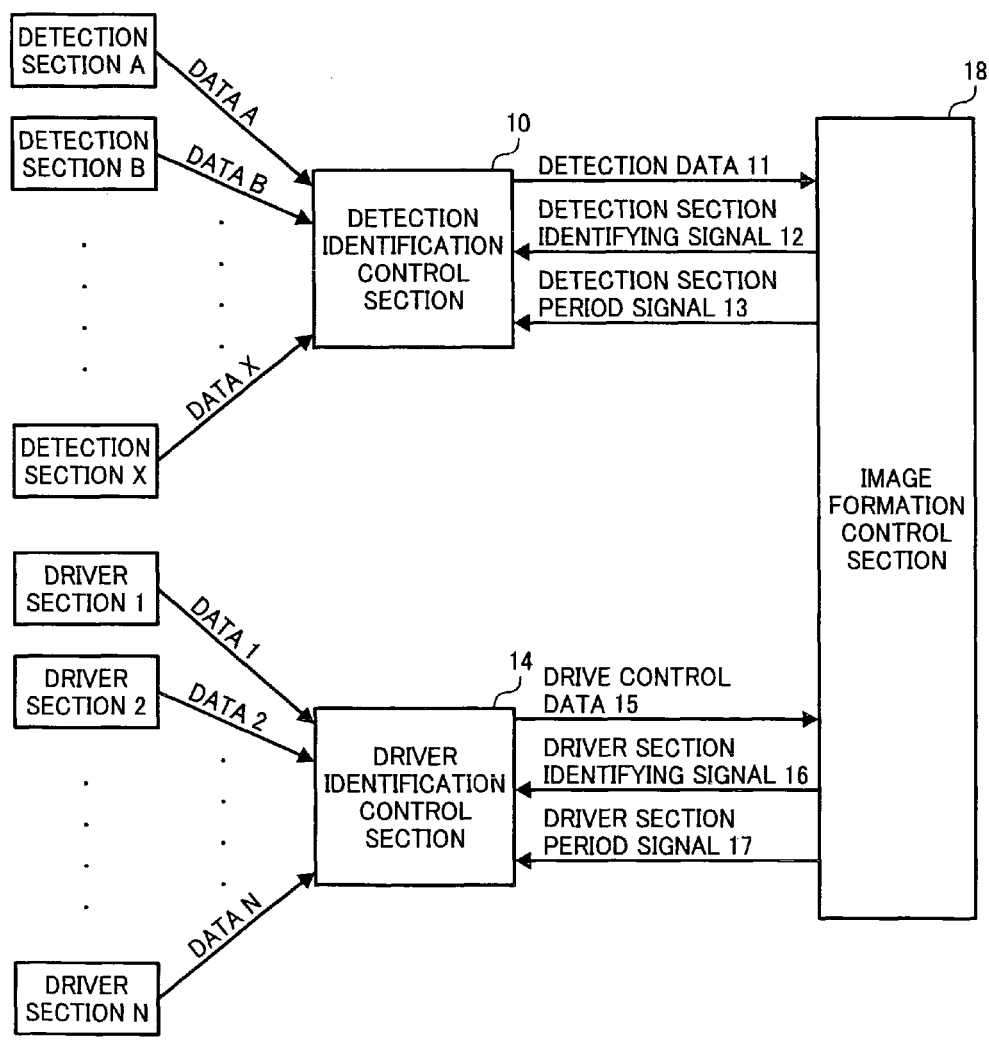
FIG. 1 shows an example of basic system configuration of peripheral devices of the engine of the image formation apparatus according to the present invention.

FIG. 1 shows an example of basic system configuration of peripheral devices of the engine of the image formation apparatus according to the present invention. A plurality of detection sections A, B, . . . X detect states of their respective subjects of detection, and output binary signals (1 or 0) as a result of the detection to a detection identification control section 10 disposed near the detection sections. Each of the detection sections A, B, . . . X is supplied with power source from the detection identification control section 10 (not shown). The detection identification control section 10 is also inputted with a detection section identifying signal 12 and a detection section period signal 13 from an image formation control section 18 (hereinafter, referred to as control board) which controls the peripheral devices of the engine of the image formation apparatus. Also, detection results of the detection sections are inputted as detection data 11 to the control board 18 from the detection identification control section 10.

Further, a plural of driver sections 1, 2, . . . N output driving signals to their respective subjects of driving via data (1, 2, . . . N) lines and are connected via the data lines with a driver identification control section 14 disposed near the driver sections. The driver identification control section 14 is inputted with a driver section identifying signal 16 and a driver section period signal 17 from the control board 18 of the image formation apparatus. Also, drive control data 15 of the driver sections is outputted to the control board 18 from the driver identification control section 14.

FIG. 2 is a timing chart showing periods where the detection section identifying signal and the detection data signal are validated by the detection section period signal. As shown in FIG. 2, the detection section period signal 13 generates pulses (p1, p2, p3) at predetermined intervals (t1, t2). The intervals t1, t2 can be fixed values or can be changed according to the number of detection sections to be identified. The detection identification control section 10 generates gate signals of /Reset and Detect from the detection section period signal 13, and determines a period (decode) where the detection identifying signal is validated and a period (valid) where the detection data signal is validated. The detection identification control section 10 identifies a detection section as a subject from the plurality of detection sections according to the detection identifying signal 12 during the period where the identifying signal is validated, while it outputs a detection result of the identified detection section to the detection data line during the period where the detection section data signal is validated as shown in the drawing. The control board 18 captures, as the detection result of the identified detection section, data on the detection data line outputted during the valid period (valid) of the data signal, and reflects the detection result in its image formation operation.

FIG. 3 shows one example of the identification of the detection section. The detection identification control section 10 identifies a detection section in question from a detection section group to be identified, by counting the number of pulses of the detection section identifying signal generated during a period where the detection section identifying signal 12 is validated. That is, how the detection section in question is identified according to the number of pulses is decided in advance. For example, when the number of pulses of the identifying signal is pnA during a valid period A, the detection section A is selected, likewise, when the number of pulses is pnB during a valid period B, the detection section B is selected, likewise, when the number of pulses is pnC during a valid period C, the detection section C is selected.

Figure 4:
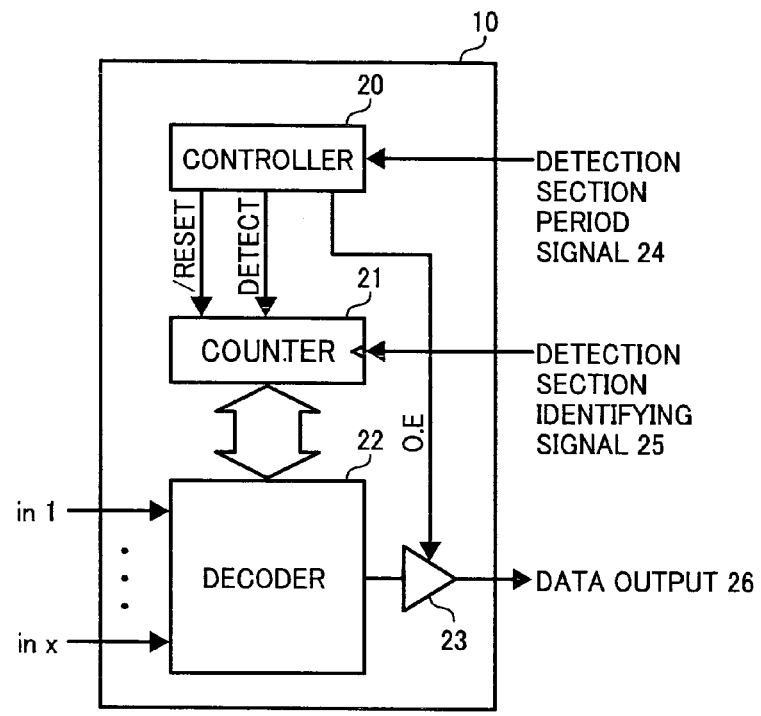
FIG. 4 is a block diagram of a detection identification control section.

FIG. 4 shows operation of the detection identification control section 10. A controller 20 receives the detection section period signal 24 and generates the /Reset signal and the Detect signal shown in FIG. 2. As not shown in FIG. 2, the controller 20 also generates an output enable signal (O.E) to validate data on the detection data line. A counter 21 counts the number of pulses as identification data of the detection section identifying line during a valid period of a detection section identifying signal 25 determined by the /Reset and Detect signals generated in the controller 20, and outputs the counter value to a decoder 22 having a plurality of data lines in1 to inx connected thereto.

The decoder 22 identifies and selects data of a single predetermined detection section from data on the data lines in1 to inx in accordance with the counter value. The selected data is validated by the above O.E signal fed into the control circuit 23 and the selected data is outputted via the data output 26 for the valid period to the detection data line 11 connected with the control board 18.

Figure 5:
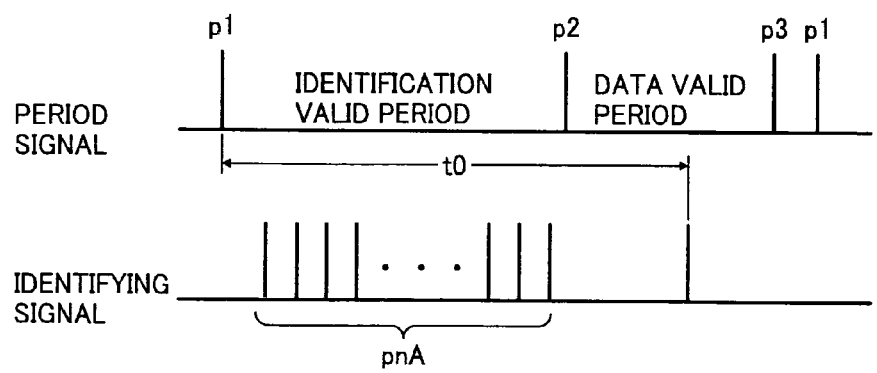
FIG. 5 is a timing chart showing a valid period of drive control data of the driver section.

The identification of the driver section is performed similarly to that of the detection section, except that the timing at which drive control data is validated is different from that at which the detection identifying signal is validated, as shown in FIG. 5. Drive control data on the drive control data line 15 is validated at a rising edge of a pulse p2 of the driver section period signal 17. In a case where accurate drive timing is not required, the data on the drive control data line is captured and outputted to a driver section in question at a fixed timing for a drive data valid period (between p2 to p3). On the contrary, when very accurate drive timing is required, pulses are outputted to the identifying signal line at a desired timing (t0) for the drive data valid period (between p2 to p3) to output data (drive signal) on the drive control data line to the driver section in question in accordance with the pulses. In this way, the drive timing can be finely adjusted.

For example, when a DC motor tarts driving, and a solenoid turns on by a drive signal of high level data on the data line is turned to high level during the valid period, and the pulses are outputted to the identifying line at a desired timing. Also, when the DC motor stops or the solenoid turns off the data is turned to low level during the valid period, the pulses are generated at a desired timing as described above.

The period signals of the detection section and the driver section are repetitively outputted as a set of pulse signals (p1, p2, p3), as shown in FIG. 2. The identifying signals of the detection section and the driver section on the identifying lines are validated during a period t1 between p1 and p2, and then data thereof on the respective data lines is validated as data of the detection or driver section in question during a period t2 between p2 and p3. The interval between p3 and next p1 is determined upon a request from the control board 18. For example, to periodically capture the detection results of the plurality of the detection sections, a pulse sequence (p1 to p3) are repetitively outputted at a fixed interval of p3 and the next p1. Also, to output data when needed such as in the driver section of the actuator, the length of the interval need not be determined specifically.

Figure 6:
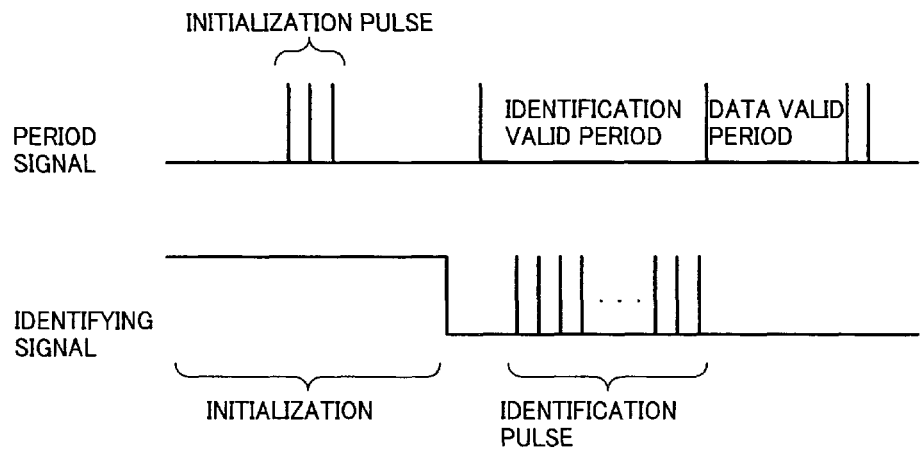
FIG. 6 shows an example of initialization.

Here, the detection identification control section and the driver identification control section are initialized at power-on, in order to determine the pulse signals p1, p2, p3 of the period signals of the detection section and the driver section. FIG. 6 shows an example of the initialization. Before the generation of the pulse signals p1, p2, p3 to determine the periods, each identifying signal is turned to high level an initialization pulse signal is outputted to each period signal, and then period deciding signal (Reset, Detect) generator circuits of the identification control sections are cleared.

Figure 7:
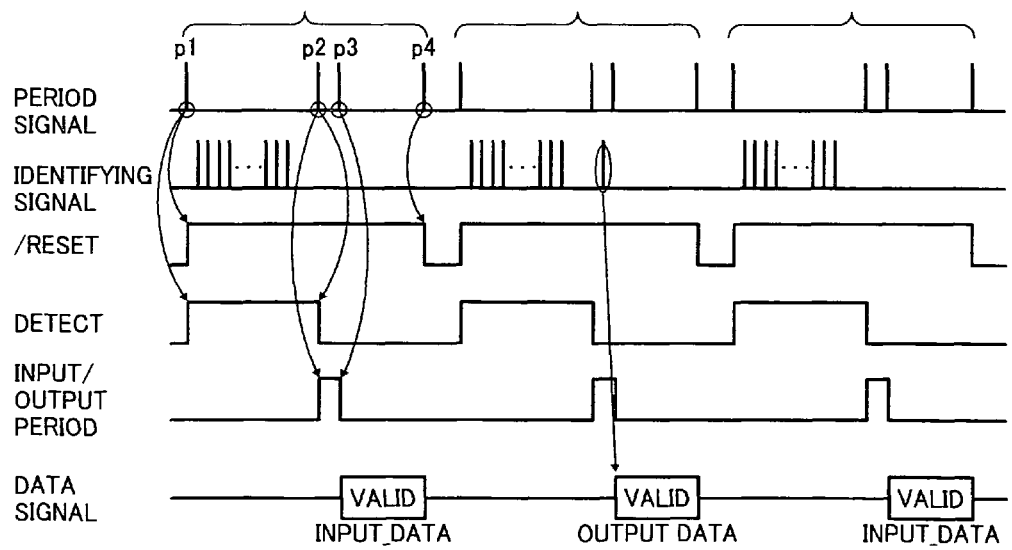
FIG. 7 shows period signals according to the present invention.

FIG. 7 shows the period signals according to the present invention. A set of pulse signals (p1, p2, p3, p4) are set by adding another pulse signal to the pulse signals shown in FIG. 2, to set, prior to the data valid period, a period where input/output of a data signal is decided. Thereby, the identifying signals and the data signals are shared by the detection section and the driver section. That is, it is configured that data input/output during the data valid period is determined according to a state of the identifying signal line during the input/output period determined by the period signals.

For example, in generating a pulse signal on the identifying signal line during the input/output period, the image formation control section outputs, to the data line, data as drive control data of the driver section in question (output device) identified by the identifying signal. In generating no pulse signal, the section in question is to be a detection section so that the image formation control section captures data on the data line as a detection signal during the valid period.

Figure 8:
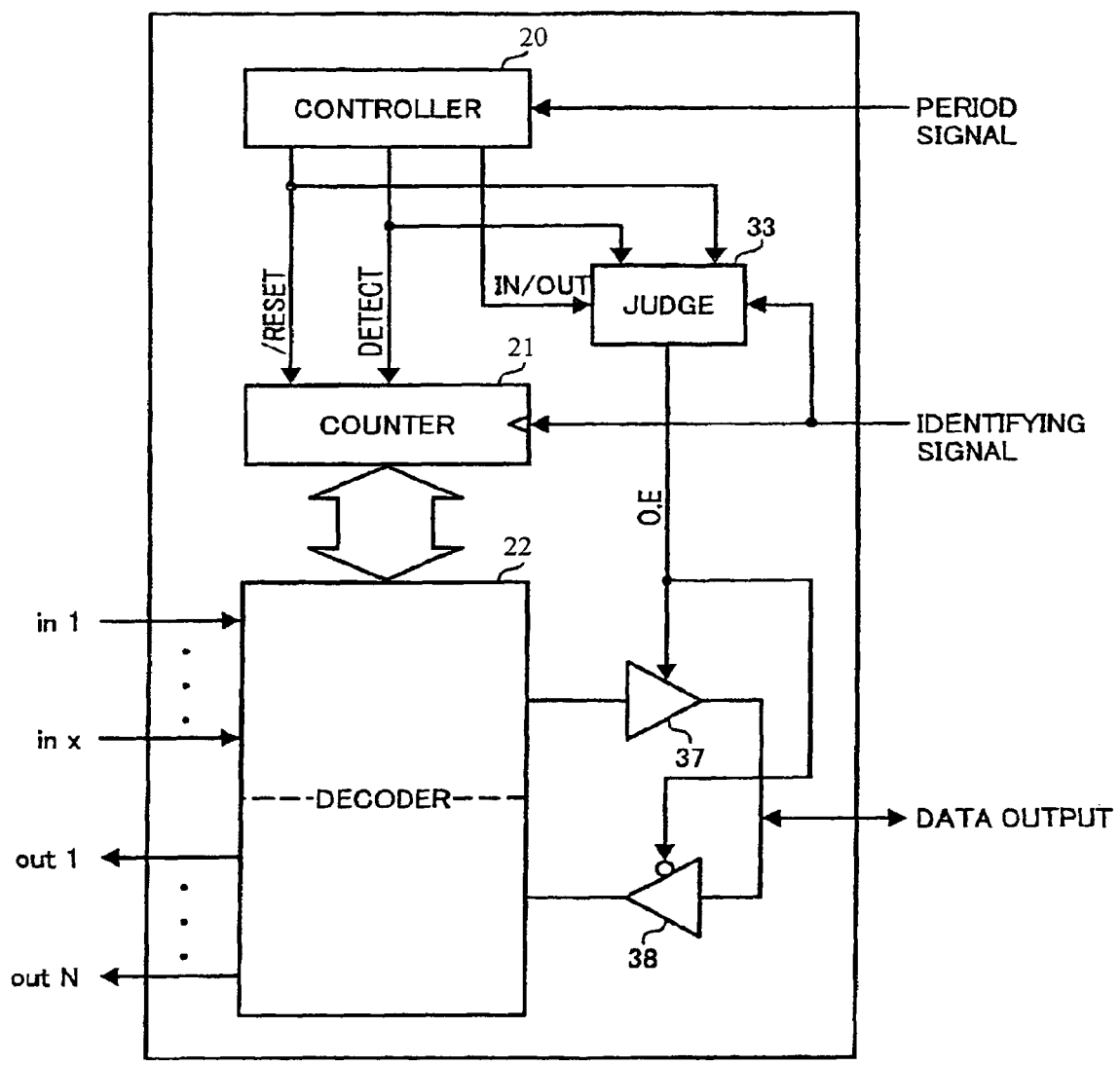
FIG. 8 is a block diagram showing a configuration of the identification control sections.

FIG. 8 is a block diagram showing the configuration of the identification control section. The identification control section herein is configured by adding a judge circuit (judge) 33 to decide data input/output and control circuits 37, 38 to control the data input/output on the data line to the detection identification control section 10.

FIG. 9 shows a timing at which the input/output deciding period is set immediately before the identification period. Setting the input/output deciding period in this way makes it possible to share the identifying signals number of pulses for identification) with the detection section and the driver section. This enables a reduction in the number of the identifying signals to shorten the identification period as well as a reduction in the size of the counter in the control block. For instance, according to the conventional ma formation apparatus, with the number n of pulses for identification, a section in question is primarily determined to be a detection section n depending only on the number of pulses for identification, while according to the present invention, it is determined to be a detection section n or a driver section n in accordance with the identifying signal during the input/output period. Further, in a case where the detection section and the driver section are used in pair, applying the same identification number (number of pulses) to the driver con and the detection section makes the control of identification of input/output devices more effective and adoptable.

As shown in FIG. 9, the first set of pules (set 1) and the second set of pulses (set 2) are pod (pair 1). The driver section is identified and driven with the first set of pulses while the detection section is identified and detected with the second set of pulses. This enables easy check-up of a variation caused by the driving of the driver section without controlling the identifying signals (without changing the number of pulses for identification). For example, a solenoid, a motor or the like is turned on by the driver section to operate a contact/release mechanism. Then, by obtaining a result of the operation from a result of the detection sections in the contact/release mechanism, it is possible to check up, immediately after the driving, whether the contact/release mechanism is correctly driven.

Figure 10A:
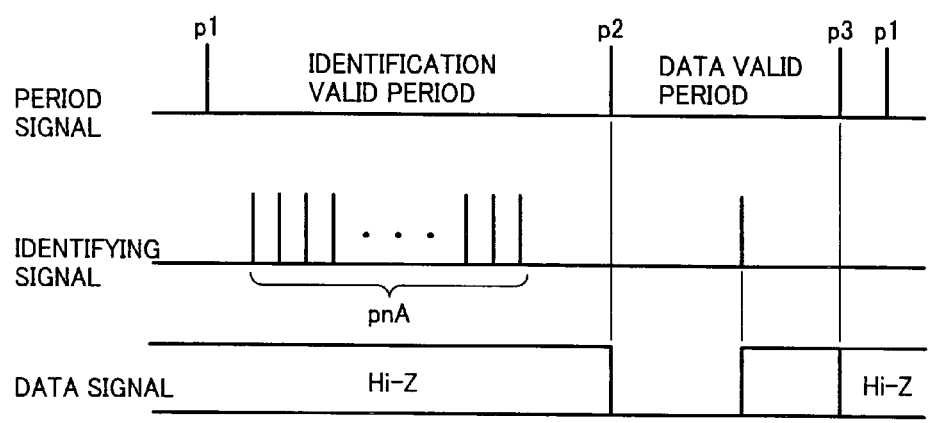
FIGS. 10A and 10B are timing char when a detection section to be identified is for detection of presence or absence of paper sheets or a unit and outputs a 1-bit signal.

Next, the identification of the detection section will be described. First, pulse signals are outputted to the identifying signal line in accordance with a detection section to be identified during the data valid period which is determined by the period signals. As shown in FIG. 10A, a single pulse signal is outputted when the detection section to be identified is for detection of presence or absence of paper sheets or a unit and outputs a 1-bit signal. The detection identification control section outputs the detection result of the detection eon to the data line in the data valid period, and inverts the detection result outputted at a falling edge of the single pulse signal on the identifying signal line. That is, when the detection insult is low, it will turn to high at the falling edge of the pulse signal.

The control board 18 captures data on the data line during the data valid period, and captures data again after output of one pulse signal. When the two pieces of data are inversed, the control board 18 determines that the detection section is identified correctly, and makes the first captured data be a result of the detection section. During the identification of the detection section, only the data line (output line) of the detection section identified in the data valid period is connected, while the data lines are disconnected (Hi-Z in FIG. 10: high impedance) when no identified detection section is present in and outside the data valid period.

In this case, the data line appears to be high even without presence of the detection section corresponding to the identifying signal, causing the image formation control sections to misjudge that a detection section has been identified and the detection result is high. To prevent this from occurring, the detection identification control section is configured to determine erroneous setting of the identifying signal by inversing data as described above.

Figure 10B:
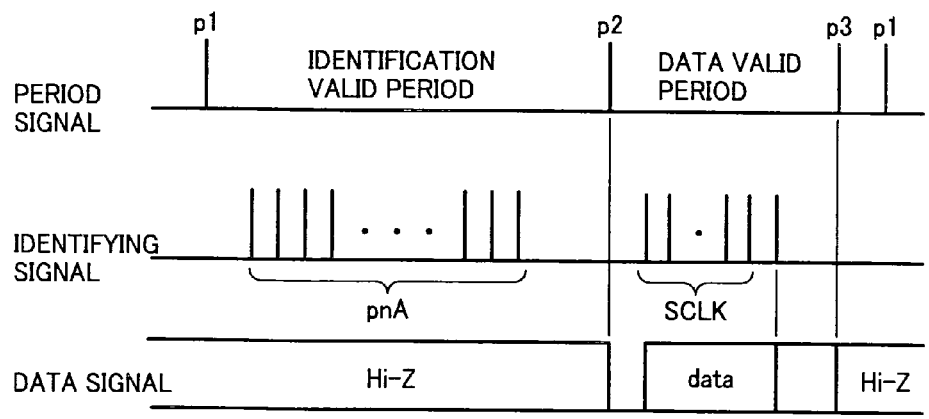

FIG. 10B shows a timing chart when a detection section to be identified is an AD converter with plural bit output. A pulse sequence of a number of pulses (SCLK) necessary to output bits plus one pulse are outputted as transfer clocks of output bits of the AD converter. The necessary number of pulses (SCLK) to output all the output bits is a sum of the number of leading clocks and the number of bits of the AD converter. In the AD converter, data inversion is made at a failing edge of a pulse having a result of the final output bit added FIG. 10B shows a case where an inversion value of the final bit data is high after the necessary number of output bits of the AD converter are output (data in the FIG. 10B) in accordance with SCLK.

As configured above, connecting the data line to the output of the detection section and inversing data by the pulse outputted from the identification control section when no detection section corresponding to the identifying signal is identified makes it possible to check whether or not the identification section has made erroneous detection (absence of a detection section to be identified).

Figure 11:
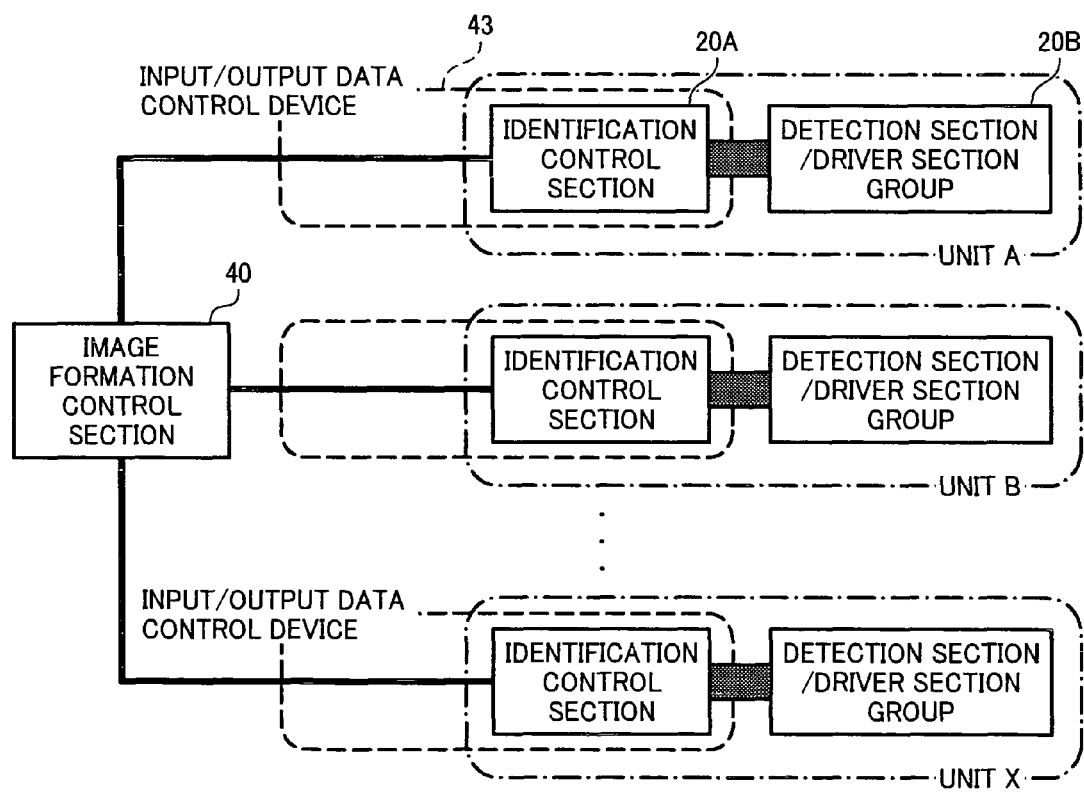
FIG. 11 shows a configuration of a plurality of input/output data control devices.

The status detection sections of the image formation apparatus are largo in number for different use, for example, for door opening/closing, mounting of the respective replaceable (expendables) units, toner concentration, size and disposition of a recording medium (paper), and so on. Likewise, the driver sections of the actuator are large in number, such as for a transfer roller as contact/release mechanism, a cleaning blade, switching for carrier paths of transfer paper, or start/stop of different kinds of DC drive motors. It is preferable to configure a plurality of input/output data control devices 43 as shown in FIG. 11 by dividing, into plural groups 20B, the large number of detection sections and driver sections according to a location or a unit where they are mounted and providing a set of signal lines (data line, identifying signal line, period signal line) and an identification control section 20A for each of the detection section/driver section groups.

Here, a toner cartridge unit is explained as a way of example. The toner cartridge unit can be configured to include four detection sections for mounting of toner cartridges (Y, M, C, K) and four detection sections for toner ends (Y, M, C, K). The detection sections for mounting of toner cartridges are switches, and the detection sections for toner ends operate according to a different detection method from sensors but both output detection results with binary signals of 5V or 3.3V. Therefore, the above eight detection sections can be grouped into one detection section group.

Further, DC motors as toner supply drivers for the eve colors can be grouped into one driver section group. Then, the identification control sections are provided in the toner cartridge unit and connected with the data line, identifying signal line, and period signal line.

In another example, a paper feeder unit can be configured to include a plurality of detection sections such as a paper size detection section, a remaining paper sheet detection section, and a paper feeder detection section. These detection sections are grouped into one detection section group, and a motor for each paper feeder unit and clutches/solenoids for change of carrier paths are grouped into one driver section group, thereby creating a single input/output data control device.

Figure 12:
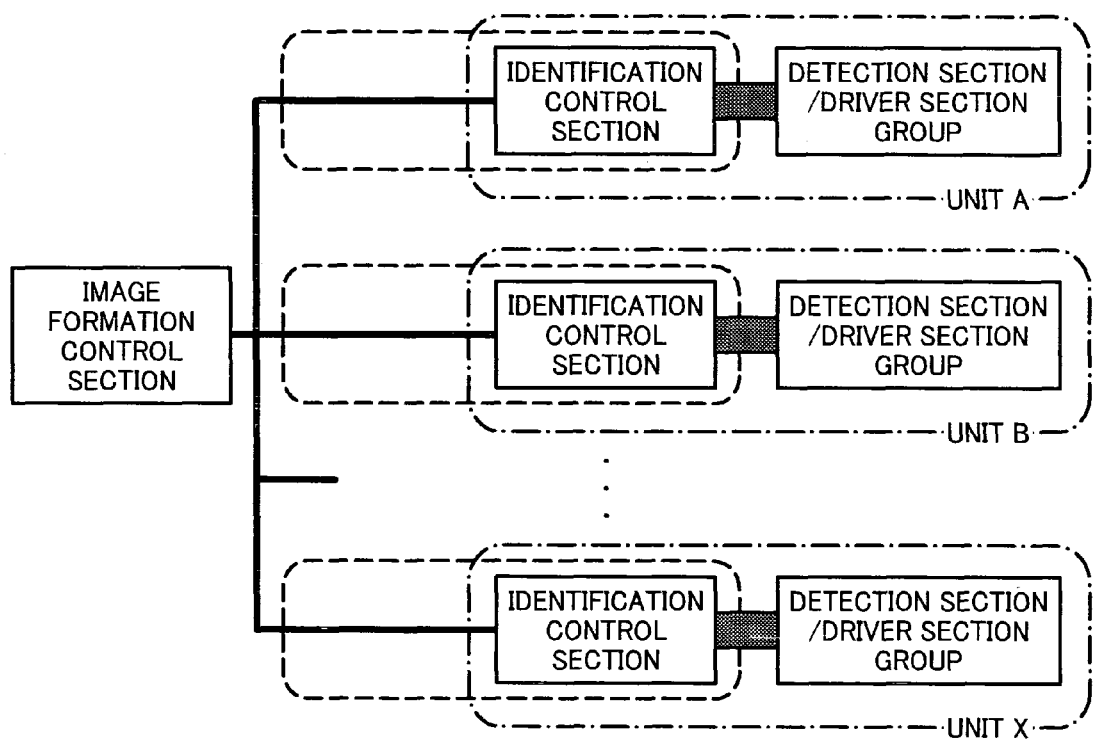
FIG. 12 shows the plurality of identification control sections connected via a set of signal lines.
Figure 13:
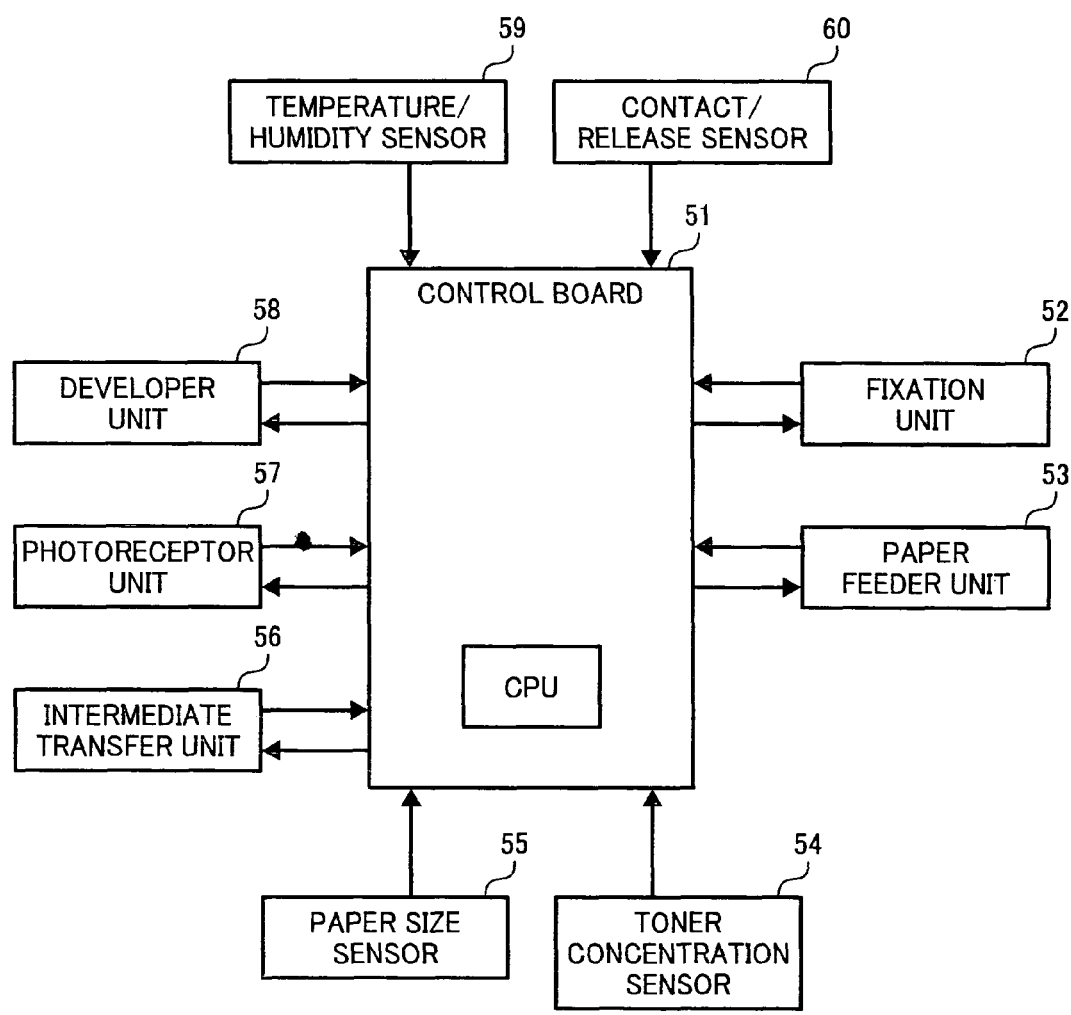
FIG. 13 shows an example of basic system configuration of peripheral devices of the engine of a conventional image formation apparatus.

In another example, it can be configured that the detection sections and the driver eons are grouped into a plurality of groups according to a location or a unit where they are mounted, and a plurality of identification control sections are provided for the groups, respectively. The identification control sections are connected with each other via a set of signal lines as shown in FIG. 12.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An image formation apparatus including a plurality of detection sections performing status detection of the apparatus and a plurality of driver sections driving the apparatus, the image formation apparatus comprising:
    a first set of signal lines including a detection data line through which a detection result from the plurality of detection sections is transmitted, a first identifying signal line through which a first identifying signal to identify one of the plurality of detection sections is transmitted, and a first valid period signal line through which a first period signal to determine a valid period of the first identifying signal on the first identifying signal line and to determine a valid period of data on the detection data line is transmitted;
    a detection identification control section which identifies a detection section in question according to the first identifying signal, and determines data on the detection data line as valid data for the detection section in question;
    a second set of signal lines including a drive control data line through which a drive control signal is transmitted to the plurality of driver sections, a second identifying signal line through which a second identifying signal to have identified one driver section from the plurality of driver section is transmitted, and a second valid period signal line through which a second period signal to determine a valid period of the second identifying signal on the second identifying signal line and to determine a valid period of data on the drive control data line is transmitted;
    a driver identification control section which identifies a driver section in question according to the second identifying signal, and determines data on the driver control data line as valid data for the driver section in question; and
    an image formation control section which controls the detection identification control section and the driver identification control section.

2. An image formation apparatus according to claim 1, wherein
    after validating the first and second identifying signals to be outputted to the first and second identifying signal lines according to the first and second period signals outputted from the image formation control section to the first and second valid period signal lines, the detection identification control section and the driver identification control section determine data on the detection data line and on the drive control data line as valid data for the detection section or the driver section determined by the respective identifying signals.

3. An image formation apparatus according to claim 1, wherein:
    a pulse is output to either of the first and second identifying signal lines according to a section to be identified during a period where data on the data line determined by the period signal is validated; and
    when the section to be identified is a detection section, erroneous setting of the identifying signal can be decided, and when the section to be identified is a driver section, driving timing therefor is finely adjustable.

4. An image formation apparatus including a plurality of detection sections performing status detection of the apparatus and a plurality of driver sections driving the apparatus, the image formation apparatus comprising
    an input/output data control device including an identification control section which additionally sets, before determining a data valid period of a data line, an input/output period on a period signal line through which a period signal to determine the data valid period of the data line is transmitted, outputs an identifying signal of the detection sections and an identifying signal of the driver sections via a common identifying signal line and outputs data of a plurality of detection sections and data of a plurality of driver sections via a common data line to determine data input/output on the data line according to a state of the identifying signal line during the input/output period determined by the period signal, identifies a detection section or a driver section in question according to the identifying signal line, the data line, and the period signal line, and determines the data on the data line as valid data for the identified section, the input/output period being a period for which data input/output on the data line is decided.

5. An image formation apparatus according to claim 4, wherein:
    a pulse is output to the identifying signal line according to a section to be identified during a period where data on the data line determined by the period signal is validated; and
    when the section to be identified is a detection section, erroneous setting of the identifying signal can be decided, and when the section to be identified is a driver section, driving timing therefor is finely adjustable.

6. An image formation apparatus according to claim 4, further comprising
a plurality of input/output data control devices including a set of signal lines composed of the data line, the identifying signal line, and the period signal line, and the identification control section, wherein
each of the input/output data control devices is provided for each location, function, or unit where the detection sections and the driver sections are disposed.

7. An image formation apparatus according to claim 4, further comprising
a plurality of identification control sections identifying a detection section or a driver section in question according to an identifying signal line to determine data on a data line as valid data for the identified section, wherein:
each of the identification control sections is provided for each location, function or unit where the detection sections and the driver sections are disposed; and
the plurality of identification control sections are connected with a set of signal lines composed of the data line, the identifying signal line, and the period signal line.

8. An image formation apparatus including a plurality of detection sections performing status detection of the apparatus and a plurality of driver sections driving the apparatus, the image formation apparatus comprising
an input/output data control device including an identification control section which additionally sets, immediately prior to a period where an identifying signal is validated, an input/output period on a period signal line through which a period signal to determine a data valid period of a data line is transmitted, outputs an identifying signal of the detection sections and an identifying signal of the driver sections via a common identifying signal line and outputs data of a plurality of detection sections and data of a plurality of driver sections via a common data line to determine data input/output on the data line according to a state of the identifying signal line during the input/output period determined by the period signal, identifies a detection section or a driver section in question according to the identifying signal line, the data line, and the period signal line, and determines the data on the data line as valid data for the identified section, the input/output period being a period for which data input/output on the data line is decided.

9. An image formation apparatus according to claim 8, wherein:
a pulse is output to the identifying signal line according to a section to be identified during a period where data on the data line determined by the period signal is validated; and
when the section to be identified is a detection section, erroneous setting of the identifying signal can be decided, and when the section to be identified is a driver section, driving therefor is finely adjustable.

10. An image formation apparatus according to claim 8, further comprising
a plurality of input/output data control devices including a set of signal lines composed of the data line, the identifying signal line, and the period signal line, and the identification control section, wherein
each of the input/output data control devices is provided for each location, function, or unit where the detection sections and the driver sections are disposed.

11. An image formation apparatus according to claim 8, further comprising
a plurality of identification control sections identifying a detection section or a driver section in question according to an identifying signal line to determine data on a data line as valid data for the identified section, wherein:
each of the identification control sections is provided for each location, function or unit where the detection sections and the driver sections are disposed; and
the plurality of identification control sections are connected with a set of signal lines composed of the data line, the identifying signal line, and the period signal line.

* * * * *